US011337153B2

(12) United States Patent
Ahssini et al.

(10) Patent No.: US 11,337,153 B2
(45) Date of Patent: May 17, 2022

(54) NFC COMMUNICATION

(71) Applicant: PROTON WORLD INTERNATIONAL N.V., Diegem (BE)

(72) Inventors: Youssef Ahssini, Vilvoorde (BE); Guy Restiau, Ramillies (BE)

(73) Assignee: Proton World International N.V., Diegem (BE)

( * ) Notice: Subject to any disclaimer, the term of this patent is extended or adjusted under 35 U.S.C. 154(b) by 45 days.

(21) Appl. No.: 16/751,112

(22) Filed: Jan. 23, 2020

(65) Prior Publication Data

US 2020/0245250 A1 Jul. 30, 2020

(30) Foreign Application Priority Data

Jan. 25, 2019 (FR) ...................................... 1900667

(51) Int. Cl.
*H04B 7/00* (2006.01)
*H04W 52/02* (2009.01)
*H04W 4/80* (2018.01)

(52) U.S. Cl.
CPC ......... *H04W 52/0235* (2013.01); *H04W 4/80* (2018.02); *H04W 52/0241* (2013.01)

(58) Field of Classification Search
CPC ............. H04W 52/0235; H04W 4/80; H04W 52/0241; H04B 5/0068; H04B 5/0056
See application file for complete search history.

(56) References Cited

U.S. PATENT DOCUMENTS

| 9,271,300 | B2* | 2/2016 | Kasami ................. H04W 4/80 |
| 2010/0184383 | A1 | 7/2010 | Lerke |
| 2016/0071114 | A1 | 3/2016 | Gerdisch et al. |
| 2016/0072556 | A1 | 3/2016 | Lee et al. |
| 2016/0112884 | A1 | 4/2016 | Hassan et al. |

FOREIGN PATENT DOCUMENTS

| CN | 101656548 A | 2/2010 |
| CN | 101784105 A | 7/2010 |
| CN | 103297060 A | 9/2013 |
| CN | 107078845 A | 8/2017 |

* cited by examiner

*Primary Examiner* — Nhan T Le
(74) *Attorney, Agent, or Firm* — Seed IP Law Group LLP

(57) ABSTRACT

A method of wireless communication between a transponder and a terminal includes a step, implemented by the transponder, of counting a number of error signals transmitted by the terminal.

15 Claims, 4 Drawing Sheets

NFC COMMUNICATION

BACKGROUND

Technical Field

The present disclosure generally concerns wireless communications between two electronic devices, for example, a terminal and a transponder. The disclosure more particularly applies to a wireless communication method.

Description of the Related Art

Wireless communications are nowadays more and more used for different applications such as data exchange, bank payments, etc. There exists a plurality of wireless communication types, for example, near field communications (NFC), communications using high frequencies at a longer distance such as Bluetooth communications, etc.

It would be desirable to at least partly improve certain aspects of known near field communications, and more particularly certain aspects of known methods of wireless communication between two electronic devices.

BRIEF SUMMARY

There exists a desire for higher-performance devices of wireless communication between two electronic devices.

An embodiment overcomes all or part of the disadvantages of known wireless communication methods.

An embodiment provides a method of wireless communication between a transponder and a terminal comprising a step, implemented by the transponder, of counting a number of error signals transmitted by the terminal.

An embodiment provides a transponder capable of counting a number of error signals transmitted by the terminal, during a wireless communication with the terminal.

According to an embodiment, the error signals indicate an error in the reception by the terminal of a signal originating from the transponder.

According to an embodiment, the transponder is a microcircuit card.

According to an embodiment, the wireless communication is a near-field communication.

According to an embodiment, the number of signals indicating a signal reception error is compared with a threshold.

According to an embodiment, if the number of signals indicating a signal reception error is greater than the threshold, the transponder is switched to a lower power consumption mode.

According to an embodiment, the low power consumption mode is a mode where predefined circuits of the transponder are no longer powered and/or exhibit a decrease in their clock frequencies.

According to an embodiment, the threshold is in the range from 1 to 20.

According to an embodiment, the threshold is in the range from 2 to 6.

According to an embodiment, the threshold is equal to 4.

According to an embodiment, the error signals transmitted by the terminal are decoding error signals.

The foregoing and other features and advantages will be discussed in detail in the following non-limiting description of specific embodiments in connection with the accompanying drawings.

DETAILED DESCRIPTION

Figure 1:
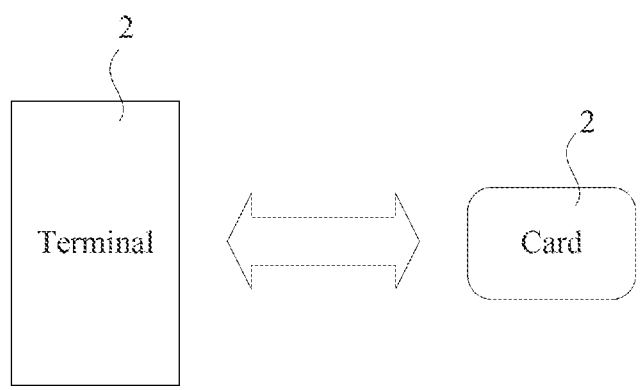
FIG. 1 very schematically illustrates a wireless communication between a terminal and a transponder.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the detailed operation of a terminal or of a transponder will not be detailed hereafter.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

Near-field communication (NFC) technologies enable to carry out short-range high-frequency communications. Such systems use a radio frequency electromagnetic field emitted by a device (terminal or reader) to communicate with another device (transponder or card).

In recent systems, a same NFC device may operate in card mode or in reader mode (for example, in the case of a near-field communication between two cellular phones). It is then frequent for devices to be powered with a battery and for their functions and circuits to be set to standby to avoid consuming power between periods of use. The devices then have to be "woken up" when they are within each other's range.

Although the case of two similar electronic devices (or NFC devices), for example, a terminal, or reader, and a transponder is assumed, all that will be described more generally applies to any system where a transponder detects an electromagnetic field radiated by a reader or terminal.

According to applications, for a communication, one of the devices operates in so-called reader mode while the other operates in so-called card mode, or the two devices communicate in peer-to-peer mode (P2P). Each device comprises various electronic circuits for generating a radio frequency (RF) signal transmitted by means of an antenna of an oscillating/resonant circuit. The radio frequency field generated by one of the devices is detected by the other device, which is located within its range and which also comprises an antenna. In certain applications, when a device is not communicating, it is switches to stand-by to decrease the consumed power. This is particularly true for battery-powered devices. When a first NFC device emits an electromagnetic field to initiate a communication with a second NFC device, the field is detected by the second device as soon as it is within its range. The field is detected by the circuits of the second device which, if they are at stand-by, are reactivated. This results in a variation of the load formed by the circuits of the second device on the resonant circuits of generation of the field of the first device. In practice, the corresponding phase or amplitude variation of the emitted field is detected by the first device, which then starts a NFC protocol of communication with the second device. On the side of the first device, it is in practice detected whether the amplitude of the voltage across the resonant circuit falls below a threshold or whether the voltage across the resonant circuit has a phase shift greater than a threshold. Once the first device has detected the presence of the second device in its field, it starts a procedure for establishing a communication, implementing transmissions of requests from the first device and of responses from the second device.

Although reference will be made hereafter to a chip card, the described embodiments more generally apply to any active transponder, that is, any communication device using a radio frequency electromagnetic field generated by a terminal to communicate, contactless, therewith.

A disadvantage of wireless communications, and more particularly of near-field communications, is that they are particularly sensitive to outer disturbances, which may be considered as parasitic signals. Such disturbances may be due to the environment where the wireless communication occurs, to parasitic devices, or also to the actual devices which try to communicate.

FIG. 1 schematically shows a wireless communication between two electronic devices: a terminal, or reader, 1 (TERMINAL), and a transponder 2 (CARD).

Terminal 1 is an electronic device that may be, for example, fixed or mobile. Terminal 1 is in charge of initiating the communication. As an example, terminal 1 is a payment terminal or a mobile phone.

Transponder 2 is a generally mobile device. According to a preferred embodiment, transponder 2 is a microcircuit card (or chip card), for example, a bank card or a transport card. Hereafter, transponder 2 will be called card. As a variation, transponder 2 may be a mobile phone. Card 2 comprises different electronic circuits capable of implementing various orders sent by terminal 1, such as, for example, authentication circuits, encryption circuits, etc. In particular, the different circuits consume more or less power during the execution of an order sent by terminal 1. Card 2 may comprise a plurality of different power supply modes where certain circuits are powered while others are not. More particularly, card 2 comprises at least one lower power consumption mode, or low power consumption mode, where certain circuits are not powered and/or have decreased clock frequencies.

Figure 1A:
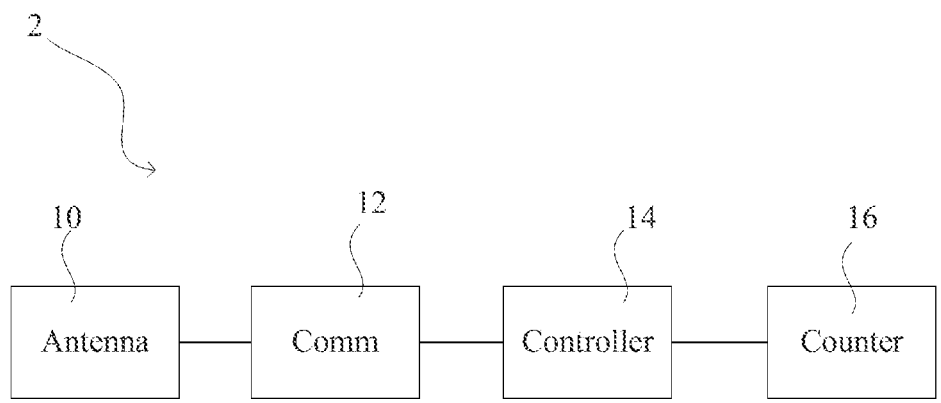
FIG. 1A is a block diagram of a transponder according to one embodiment.

According to an embodiment shown in FIG. 1A, transponder 2 is equipped with an antenna 10, a wireless communication circuit 12, a controller 14, and a counter 16. The wireless communication circuit 12 can be implemented using well-known circuitry that sends and receives communication signals via the antenna 10 to and from the terminal 1. The controller 14 may implemented using a processor, such as a microprocessor, that is programmed to generate information sent to the terminal 1 via the antenna 10 and wireless communication circuit 12 and analyze the information received from the contactless communication terminal via the antenna 10 and wireless communication circuit 12. The wireless communication circuit 12 and counter 16 may be incorporated into the controller 14 as programmed functions of a microprocessor-implemented controller or as hardware circuits of an integrated circuit implementing the controller 14. The counter 16 increments each time an error message transmitted by terminal 1 is received by the wireless communication circuit 12. More particularly, the error message is a signal, or message, from terminal 1 signifying an error concerning a response signal from card 2. The operation and the use of this counter will be detailed in relation with FIG. 4.

The wireless communication between terminal 1 and card 2 is, for example, a communication of near-field communication type (NFC). In this type of communication, card 2 is positioned within the range of terminal 1 to be able to detect the electromagnetic field of terminal 1. As an example, card 2 is positioned at a distance generally shorter than 10 cm from terminal 1. According to another example, card 2 is in mechanical contact with terminal 1.

Figure 2:
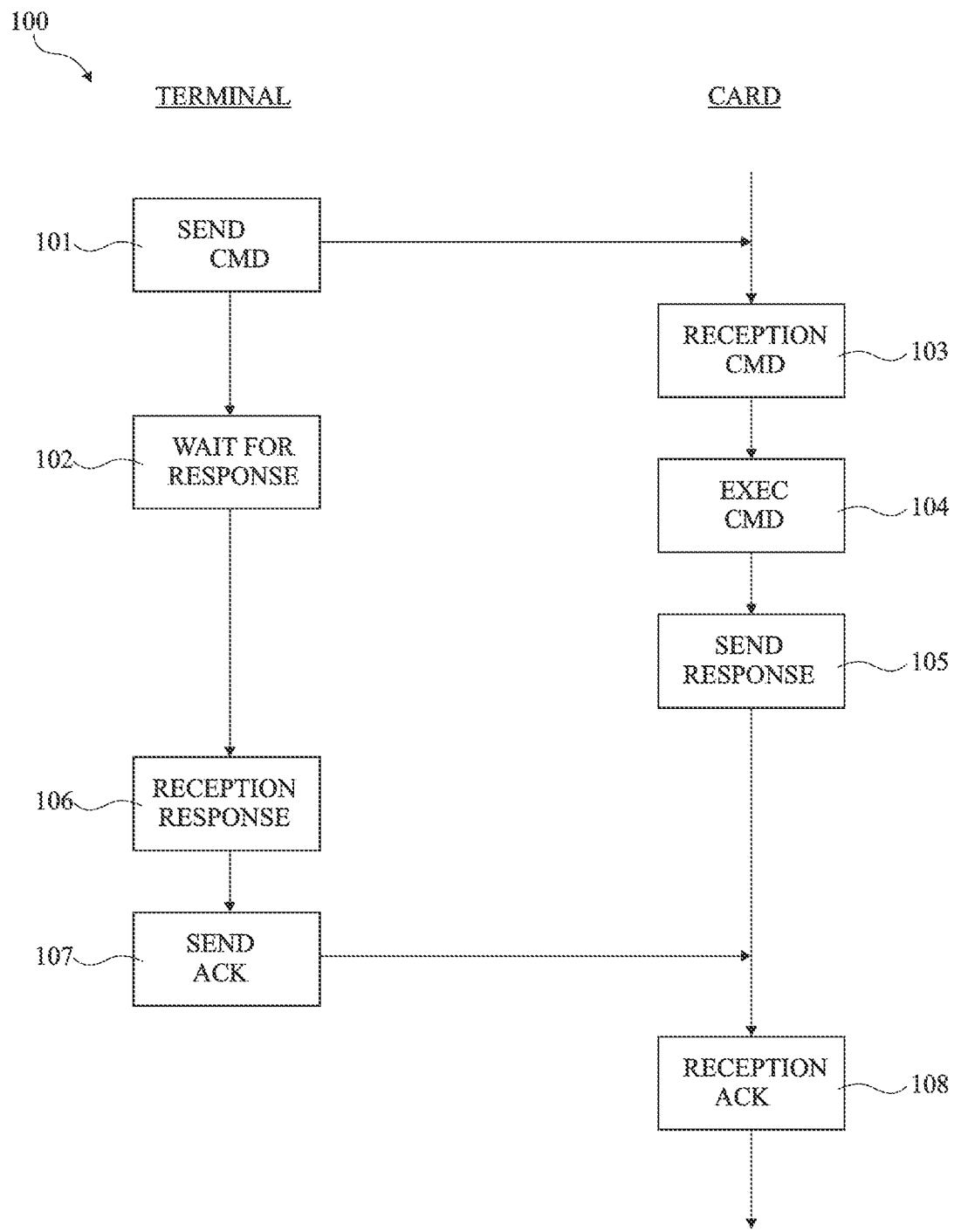
FIG. 2 shows a flowchart illustrating an embodiment of a signal exchange between a terminal and a transponder.
Figure 3:
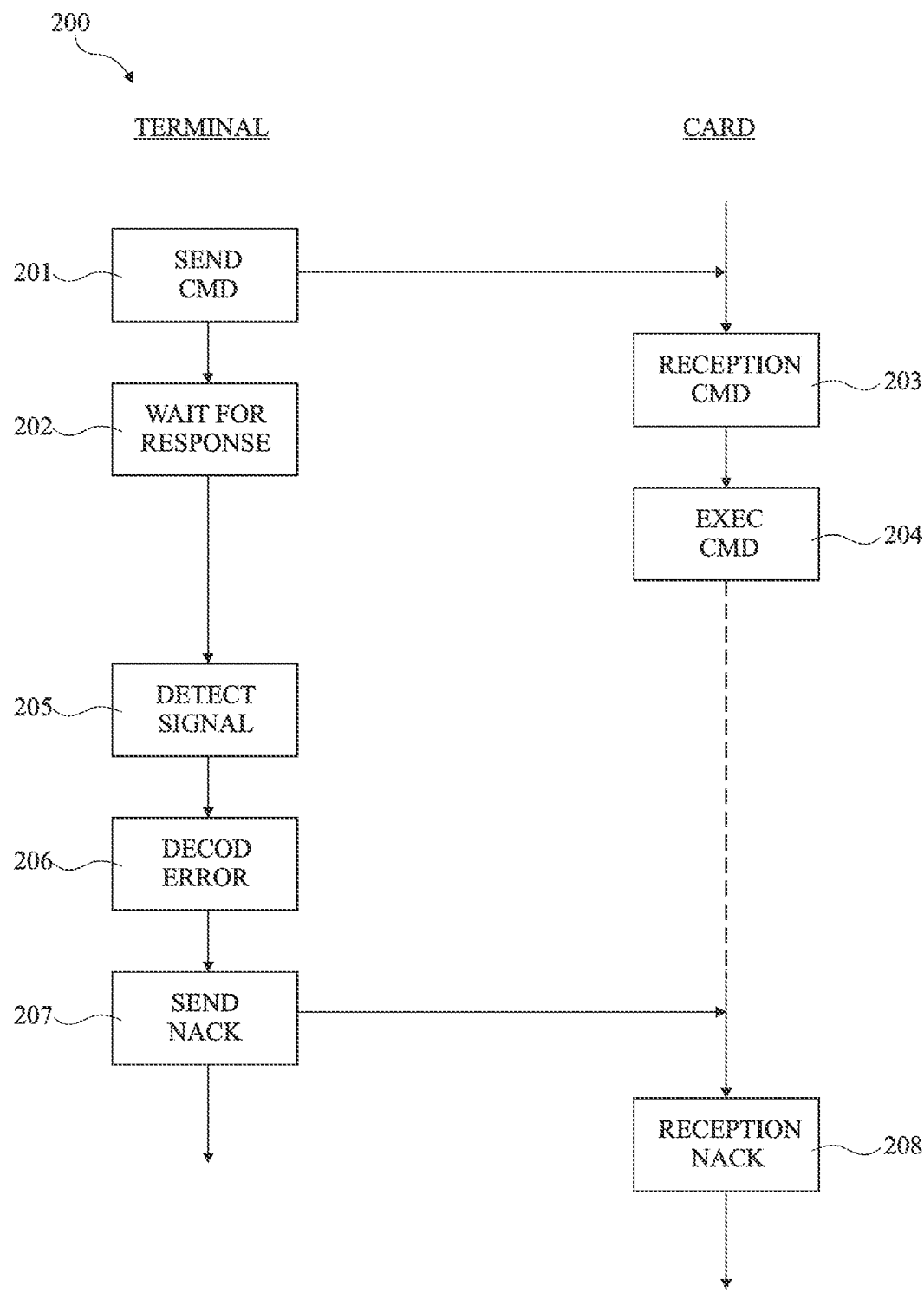
FIG. 3 shows a flowchart illustrating an embodiment of another signal exchange between a terminal and a transponder.

A wireless communication between terminal 1 and card 2 starts with a synchronization phase, for example comprising an identification method, a current anti-collision method, etc. Terminal 1 and card 2 then exchange control and response signals. Examples of exchanges of control and response signals between terminal 1 and card 2 will be detailed in relation with FIGS. 2 and 3. FIG. 2 illustrates an example of a signal exchange occurring with no error. FIG. 3 illustrates an example of signal exchange where an error occurs.

FIG. 2 schematically illustrates in the form of blocks an embodiment of an exchange 100 of control and response signals between terminal 1 and card 2.

As previously indicated, a communication between terminal 1 and card 2 starts with a synchronization phase. The signal exchange illustrated in FIG. 2 is an example of an exchange taking place once the synchronization phase is over.

Signal exchange 100 starts with the sending, by terminal 1, of a control signal (block 101, SEND CMD) to card 2. The control signal comprises instructions for card 2, for example, a data sending request, a request of execution of a code by card 2, etc. Once the signal has been sent, terminal 1 switches to a state where it waits for the response of card 2 (block 102, WAIT FOR RESPONSE). The next signal that terminal 1 will detect will be considered as a response signal from card 2.

Card 2 receives signal RF from terminal 1. Card 2 then decodes the signal and considers it as a control signal from terminal 1 (block 103, RECEPTION CMD). Card 2 then implements the received order (block 104, EXEC CMD). To execute the order, card 2 may use a plurality of the different circuits that it comprises.

Once the control has been executed, the card sends a response signal to terminal 1 (block 105, SEND RESPONSE). The response signal may be an automatic response signal at the end of the execution of the control signal or may be a response signal comprising one or a plurality of pieces of information intended for terminal 1. The response signal of card 2 takes the form of a modulation of the load formed by its circuits on the electromagnetic field generated by terminal 1 (retromodulation).

Terminal 1 detects the charge variation of the electromagnetic field (block 106, RECEPTION RESPONSE). Terminal 1 then decodes the signal and verifies that it effectively is a response signal from card 2. If the signal effectively is a response signal, an acknowledgement signal (called acknowledgement hereafter) is then automatically sent, by terminal 1, to card 2 (block 107, SEND ACK).

Card 2 detects the signal (block 108, RECEPTION ACK) and decodes it as an acknowledgement from terminal 1. The reception of an acknowledgement by card 2 indicates that the communication has been completed with no error.

FIG. 3 schematically illustrates in the form of blocks another example of implementation of an exchange 200 of control and response signals between terminal 1 and card 2.

As previously indicated, a communication between terminal 1 and card 2 starts with a synchronization phase. The signal exchange illustrated in FIG. 2 is an example of exchange taking place once the synchronization phase is over.

Signal exchange 200 starts with the sending, by terminal 1, of a control signal (block 201, SEND CMD) to card 2. The control signal comprises instructions for card 2, for example, a data sending request, a request of execution of a code by card 2, etc. Once the signal has been sent, terminal 1 switches to a state where it waits for the response of card 2 (block 202, WAIT FOR RESPONSE). The next signal that terminal 1 will detect will be considered as a response signal from card 2.

Card 2 receives signal RF from terminal 1. Card 2 then decodes the signal and considers it as a control signal from terminal 1 (block 203, RECEPTION CMD). Card 2 then implements the received order (block 204, EXEC CMD). To execute the order, card 2 may use a plurality of the different circuits that it comprises. Some of these circuits, due to their high power consumption, for example, may modify the electromagnetic field of terminal 1. Such a modification of the electromagnetic field may be considered, by terminal 1, as the transmitting of a parasitic signal by card 2.

Terminal 1 may detect the modification of the electromagnetic field during the execution of the order by card 2 (block 205, DETECT SIGNAL). The signal being a parasitic signal, it is not formatted to be decoded by terminal 1. Terminal 1 thus cannot consider it as a response signal from card 2 (block 206, DECOD ERROR). In this case, terminal 1 sends to card 2 a signal indicating an error concerning the response signal (block 207, SEND NACK) or a signal indicating a lack of received response.

Card 2 detects a signal (block 208, RECEPTION NACK) and decodes it as a signal indicating an error concerning the signal of response to the control signal. The processing, according to an embodiment, of the reception of the signal by card 2 will be detailed in relation with FIG. 4.

Although a parasitic signal has been described as originating from a circuit of card 2 used to implement an order sent by terminal 1, in practice, the parasitic signal may originate from a circuit of card 2 which is activated during the execution of the order but which is not used for this purpose, or more generally from any element disturbing the field.

Figure 4:
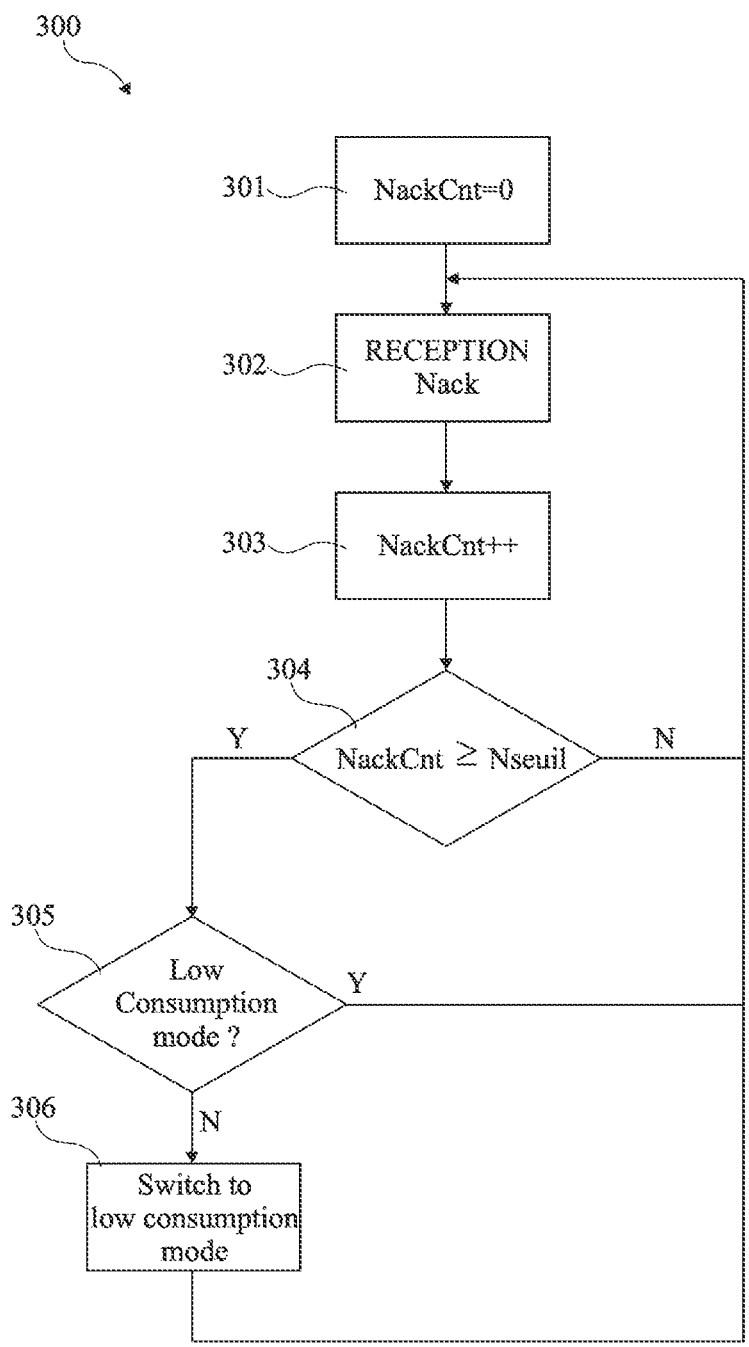
FIG. 4 shows a flowchart illustrating an embodiment of a portion of a wireless communication method, on the transponder side.

FIG. 4 is a flowchart illustrating an implementation mode of a portion 300 of a method of wireless communication between terminal 1 and card 2. More particularly, FIG. 4 illustrates the processing, by card 2, of the reception of a signal indicating an error concerning the response signal of card 2. FIG. 4 further illustrates the use of counter NackCnt.

The counter 16 includes a count value NackCnt that is initialized to zero at the beginning of each new communication between terminal 1 and card 2 (block 301, NackCnt=0). As an example, counter NackCnt may be initialized during the synchronization phase preceding the signal exchange between terminal 1 and card 2. Counter NackCnt is for example implemented by a register containing a value, binary or other, or a binary word representing the counter value.

Counter 16 aims at counting, on the card side, the number of signals indicating an error concerning a response signal received by card 2 during a communication with terminal 1. In other words, each time card 2 receives a signal indicating an error concerning the response signal (block 302, Reception Nack), the count value NackCnt is incremented (block 303, NackCnt++).

The count value NackCnt is then compared with a threshold Nseuil (block 304, NackCnt≥Nseuil). According to an embodiment, threshold Nseuil is for example in the range from 1 to 20, preferably in the range from 2 to 6, for example, equal to 4.

If the value of counter NackCnt is smaller than threshold Nseuil (output N of block 304), the signal exchange between terminal 1 and card 2 may carry on (return to block 302). As an example, terminal 1 may for example send again the same control signal to card 2, or send a new control signal to card 2, or stop the communication with card 2, etc.

If the value of counter NackCnt is greater than or equal to threshold Nseuil (output Y of block 304), this indicates that the card has reached the threshold number of errors admitted by the communication method. Threshold Nseuil is defined on design.

Once the threshold has been reached or exceeded, the card verifies its power supply mode (block 305, Low Consumption mode?). More particularly, card 2 verifies whether its power supply mode is a full-power supply mode or a low-consumption power supply mode.

If the power supply mode of card 2 is a full-power supply mode (output N of block 305), the power supply mode of card 2 switches to a low-consumption mode (block 306, Switch to low consumption mode). More particularly, the circuits of card 2 consuming a high power and which are not useful to the execution of the received order, are deactivated. A low-consumption mode may thus enable to decrease the disturbances of the electromagnetic field of card 2. As an example, card 2 may deactivate an encryption processor or also decrease the clock frequencies thereof. The signal exchange between terminal 1 and card 2 may carry on (return to block 302).

If the power supply mode of card 2 already is a low consumption mode (output Y of block 306), then card 2 remains in low-consumption mode. The signal exchange between terminal 1 and card 2 may carry on (return to block 302).

Various embodiments and variations have been described. It will be understood by those skilled in the art that certain features of these various embodiments and variations may be combined, and other variations will occur to those skilled in the art.

In particular, although the embodiments have been described in relation with a microcircuit card, they are compatible with a forming in any proximity communication device where similar problems are posed, for example, a cell phone equipped with a NFC router operating in card mode. Further, the practical implementation of the described embodiments is within the abilities of those skilled in the art based on the functional indications given hereinabove and by using or by programming circuits usual per se. For example, the counter discussed above may be implemented using a hardware circuit or may implemented in a microprocessor or other processor of the controller 14, which is programmed, such as by software or firmware, to count the number of error signals received by the microcircuit card or other transponder.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
wirelessly communicating between a transponder and a terminal, the wirelessly communicating including receiving a number of error signals from the terminal at the transponder;
the transponder counting the number of error signals received from the terminal;
comparing the number of error signals with a threshold; and
switching, in response to detecting that the number of error signals is greater than the threshold, the transponder to a lower power consumption mode by ceasing to power selected circuits of the transponder.

2. The method of claim 1, wherein the error signals indicate an error in receiving by the terminal of a signal originating from the transponder.

3. The method of claim 1, wherein the transponder is a microcircuit card.

4. The method of claim 1, wherein the wirelessly communicating using a near field communication.

5. The method of claim 1, wherein the threshold is in a range from 1 to 20.

6. The method of claim 5, wherein the threshold is in a range from 2 to 6.

7. The method of claim 5, wherein the threshold is equal to 4.

8. The method of claim 1, wherein the error signals transmitted by the terminal are decoding error signals indicative of errors in decoding signals transmitted by the transponder.

9. A transponder, comprising:
a wireless communication circuit arranged to detect and electromagnetically exchange information with a terminal when the wireless communication circuit is in proximity of the terminal;
a counter configured to count a number of error signals transmitted by the terminal, during a wireless communication with the terminal; and
a controller configured to compare the number of error signals with a threshold, to switch the transponder to a lower power consumption mode in response to detecting that the number of error signals is greater than the threshold, and to cease powering selected circuits of the transponder in the low power mode.

10. The transponder of claim 9, wherein the error signals indicate an error in receiving by the terminal a signal originating from the transponder.

11. The transponder of claim 9, wherein the transponder is a microcircuit card.

12. The transponder of claim 9, wherein the wireless communication is a near field communication.

13. A method performed by a transponder, comprising:
wirelessly communicating with a terminal, the wirelessly communicating including receiving a number of error signals from the terminal;
the number of error signals received from the terminal;
comparing the number of error signals with a threshold;
changing a power setting of the transponder in response to detecting that the number of error signals is greater than the threshold, wherein changing the power setting includes changing the transponder into a low power consumption mode in which selected circuits of the transponder are no longer powered.

14. The transponder of claim 13, wherein wireless communicating includes wirelessly communicating with near field communication.

15. The method of claim 13, wherein the threshold is in a range from 1 to 20.

* * * * *